United States Patent [19]

Koslov et al.

[11] Patent Number: 5,053,858
[45] Date of Patent: Oct. 1, 1991

[54] CHROMINANCE SIGNAL PROCESSING APPARTUS FOR WIDESCREEN TELEVISION SYSTEM

[75] Inventors: Joshua L. Koslov, Windsor; Michael A. Isnardi, Plainsboro; James J. Gibson, Princeton, all of N.J.

[73] Assignee: General Electric Company, Princeton, N.J.

[21] Appl. No.: 509,384

[22] Filed: Apr. 16, 1990

[30] Foreign Application Priority Data

Dec. 22, 1989 [GB] United Kingdom ................. 8929143

[51] Int. Cl.$^5$ ..................... H04N 11/00; H04N 11/14
[52] U.S. Cl. ......................................... 358/12; 358/16
[58] Field of Search ..................... 358/12, 16

[56] References Cited

U.S. PATENT DOCUMENTS

| | | | |
|---|---|---|---|
| 4,855,811 | 8/1989 | Isnardi | 358/12 |
| 4,882,614 | 11/1989 | Kageyama et al. | 358/12 |

FOREIGN PATENT DOCUMENTS

| | | |
|---|---|---|
| 62-17377 | 7/1987 | Japan . |
| 206992 | 9/1987 | Japan . |
| 97085 | 4/1988 | Japan . |
| 123295 | 5/1988 | Japan . |
| 92082 | 3/1990 | Japan . |

OTHER PUBLICATIONS

Yasumoto, Y. et al., "A Fully Compatible Extended Definition Television System Capable of Increasing the Aspect Ratio", Wireless Research Laboratory, Matsushita Electric Industrial Co., Ltd. U.S. patent application Ser. No. 07/435,227 filed 6 Nov. 1989.

*Primary Examiner*—John W. Shepperd
*Attorney, Agent, or Firm*—Joseph S. Tripoli; Eric P. Herrmann; Ronald H. Kurdyla

[57] ABSTRACT

In a transmitter/encoder system for processing a widescreen television signal having main panel and side panel information, side panel luminance information and side panel "Q" color difference information modulate one phase of a quadrature modulated 3.58 MHz auxiliary subcarrier, other than the standard NTSC chrominanced subcarrier, having a field reversing phase characteristics. the other (quadrature) phase of the auxiliary subcarrier is modulated with side panel wideband "I" color difference information. The "I" modulated component is filtered by an inverse Nyquist slope filter which mirrors the filter characteristics of Nyquist slop filter used at a receiver/decoder to achieve a desired flat amplitude response when the signal component containing the side panel luminannce and "Q" color difference information is demodulated.

14 Claims, 5 Drawing Sheets

FIG. 1 ENCODER

FIG. 2 DECODER

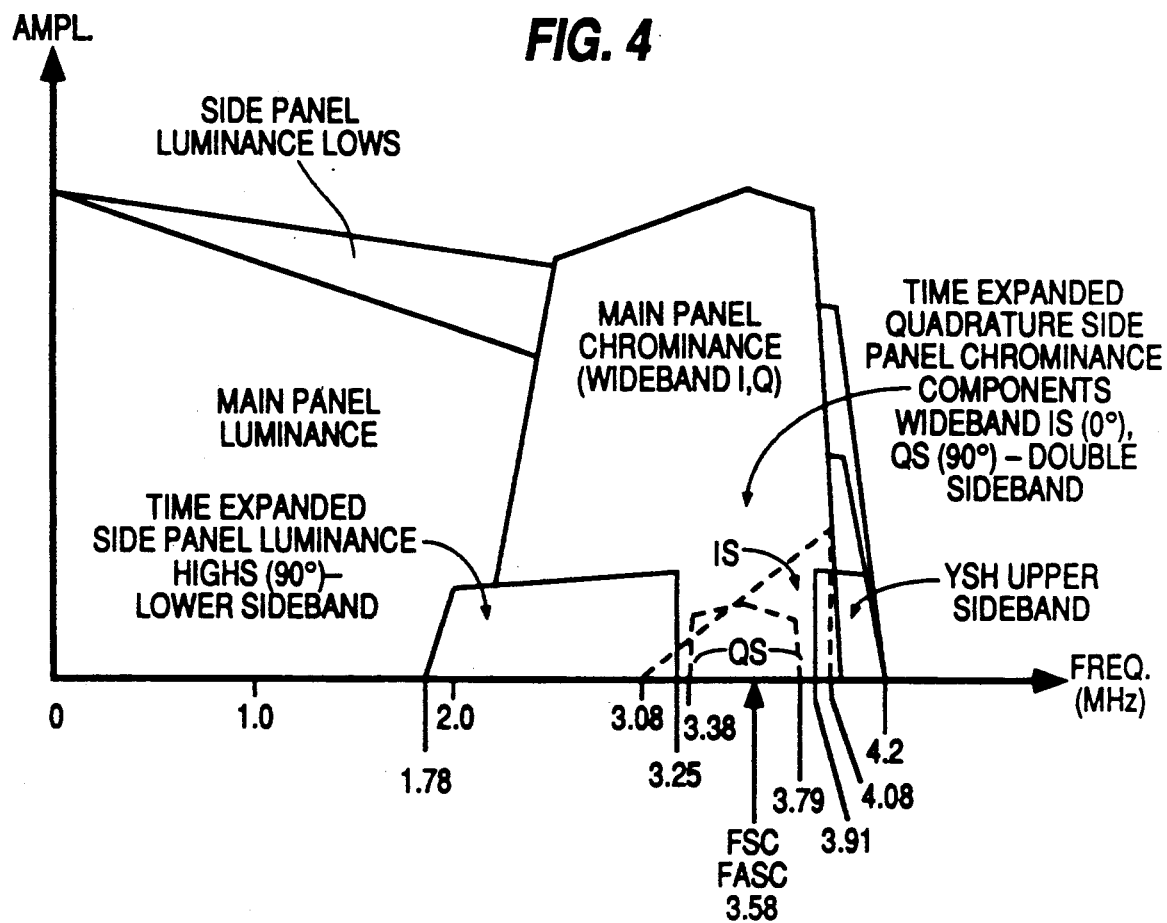

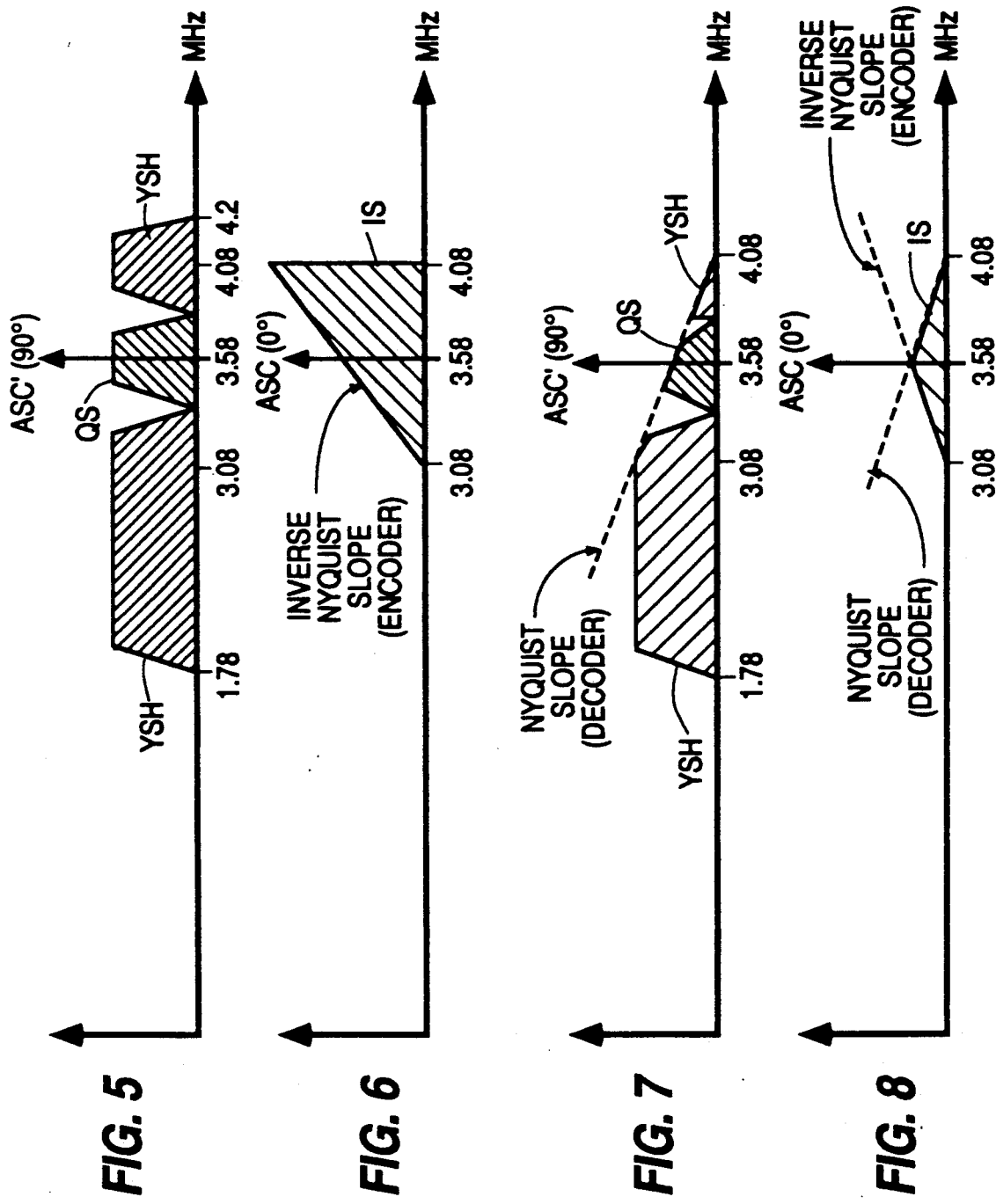

CHROMINANCE SIGNAL PROCESSING APPARTUS FOR WIDESCREEN TELEVISION SYSTEM

FIELD OF THE INVENTION

This invention concerns apparatus for encoding and decoding side panel chrominance image information of a widescreen television signal.

BACKGROUND OF THE INVENTION

A conventional television system, such as a system in accordance with the NTSC broadcast standard adopted in the United States and elsewhere, processes a television signal representative of an image with a 4:3 aspect ratio (the ratio of the width of the height of a displayed image). Recently, there has been interest in using higher aspect ratio images for television systems, such as 5:3, 16:9 and 2:1, since such higher aspect ratios more nearly approximate or equal the aspect ratio of the human eye compared to the 4:3 aspect ratio of a standard television display. Advanced television systems for producing 5:3 aspect ratio images are described, for example, in U.S. Pat. Nos. 4,816,899—Strolle, et al. and in 4,855,811—Isnardi. In these systems side panel image information is encoded by time compressing low frequency side panel luminance and chrominance information into horizontal overscan regions, and by modulating time expanded high frequency side panel luminance and chrominance information on an auxiliary subcarrier. The side panel chrominance information in these systems encompasses a relatively narrow bandwidth of approximately 600 KHz.

SUMMARY OF THE INVENTION

It is herein recognized as desirable to convey side panel chrominance information, such as the "I" color difference information, with a bandwidth significantly greater than 600 KHz in order to enhance side panel color resolution. In a disclosed preferred embodiment of the invention, first and second quadrature phased auxiliary subcarriers are modulated with first and second signals, respectively. The first signal contains both side panel high frequency luminance information and side panel narrowband "Q" color difference information. The second signal contains side panel wideband "I" color difference information. At a receiver/decoder, the auxiliary subcarriers are applied to a demodulator via a Nyquist filter for demodulating the side panel luminance and side panel "Q" color difference information, and to a demodulator for demodulating the side panel wideband "I" color difference information. The "I" modulating information as applied to both demodulators exhibits an inverse Nyquist characteristic which is the complement of that provided by the Nyquist filter. The inverse Nyquist characteristic is produced at a transmitter/encoder by an inverse Nyquist filter which filters the wideband "I" modulated auxiliary subcarrier.

BRIEF DESCRIPTION OF THE DRAWING

In the drawing:

FIG. 4 illustrates a baseband amplitude-versus-frequency spectrum of a widescreen television signal developed in accordance with the present invention.

FIGS. 5-8 show additional baseband amplitude-versus-frequency spectra of signal components associated with the disclosed apparatus. The amplitudes of these spectra are not drawn to scale.

DETAILED DESCRIPTION

Figure 1:
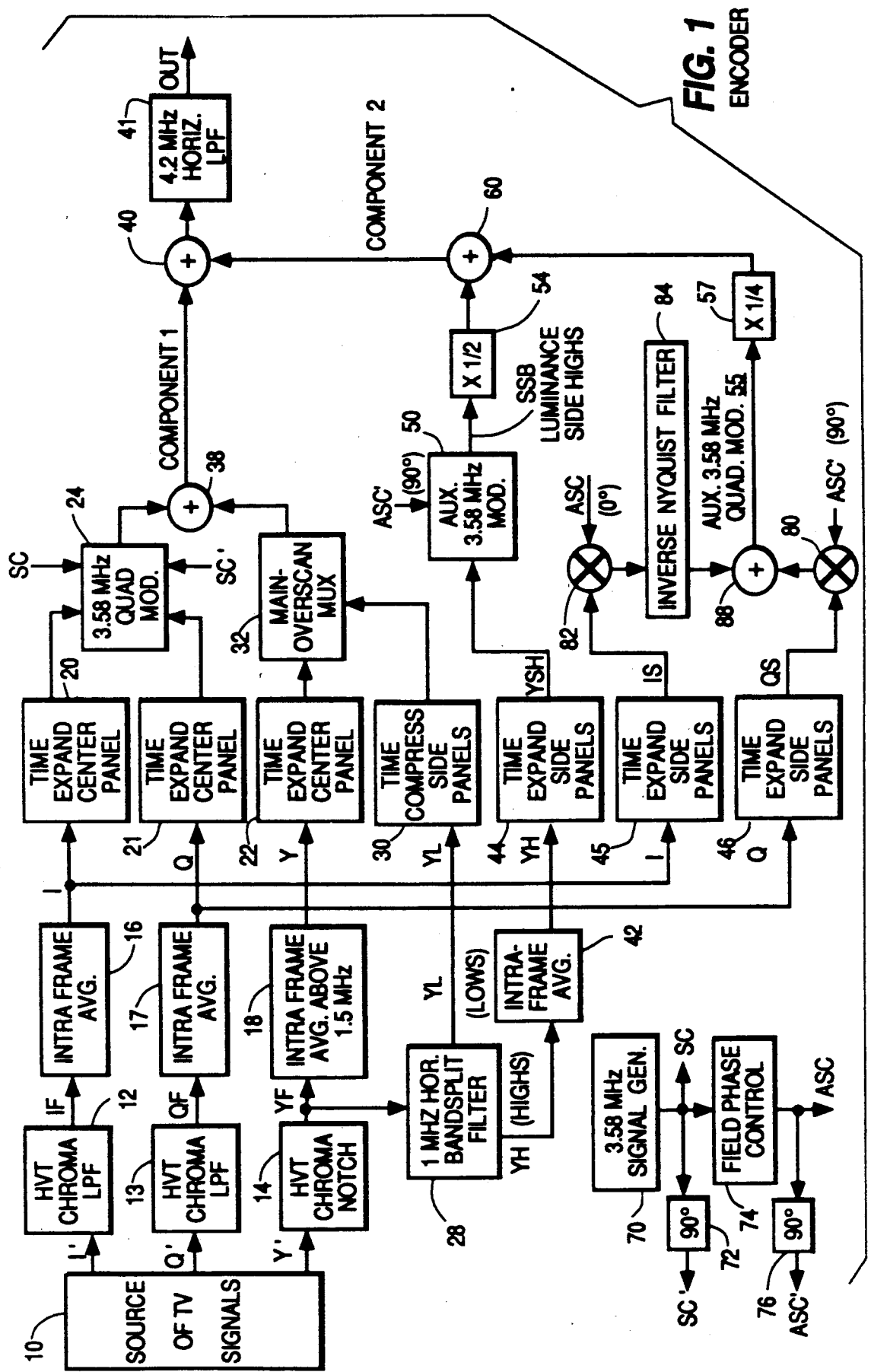
FIGS. 1 and 2 respectively show widescreen television signal encoder and decoder systems including apparatus according to the present invention.
Figure 2:
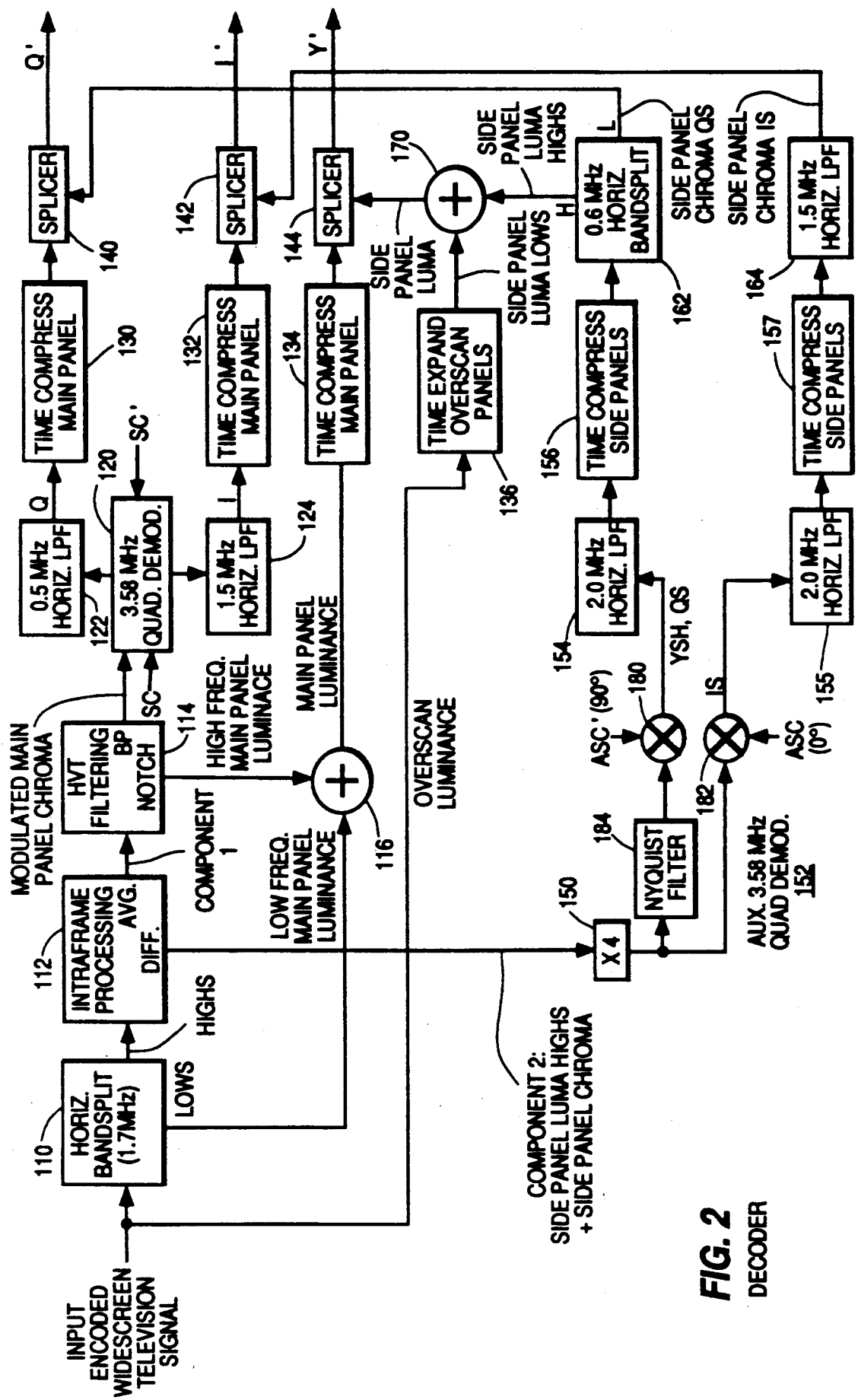
Figure 3:
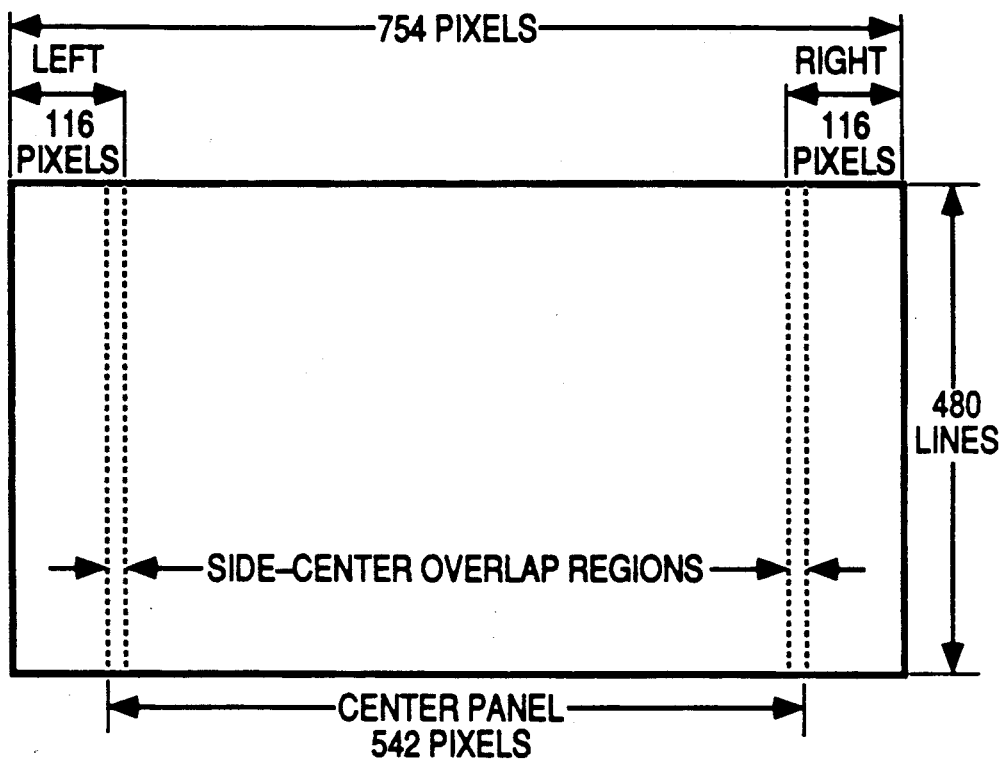
FIG. 3 shows details of a 16:9 aspect ratio widescreen image display associated with apparatus according to the invention.

Reference is made to FIGS. 3 and 4 before considering the details of the encoder and decoder apparatus shown in FIGS. 1 and 2.

As shown in FIG. 3, the width of an image display having a widescreen 16×9 aspect ratio illustratively encompasses 754 image pixels, 542 of which constitute the center (main) panel display area and 116 of which constitute each of the left and right side panel areas. The seams between the center panel area and the left and right side panel areas each include an overlap region containing about 5-10 pixels which may be processed in a variety of known ways to render the side-center seams virtually transparent to a viewer.

In the single channel NTSC compatible system to be described, wideband 525 line interlaced television signals are sourced with a baseband bandwidth of 0-5.4 MHz, which is slightly greater than the 0-4.2 MHz baseband luminance bandwidth of a standard NTSC video signal. The additional bandwidth assures that after time expansion and compression of the video signal as will be discussed, a resulting main signal luminance component exhibits a 4:3 aspect ratio and a 0-4.2 MHz video bandwidth compatible with the signal processing requirements of a standard NTSC television system.

In the frequency spectrum of FIG. 4, side panel high frequency luminance information YSH ("side highs"), exclusive of low frequency information including DC, is time expanded and modulates a nominal 90° phase of a 3.58 MHz auxiliary subcarrier (ASC). The frequency of the auxiliary subcarrier (FASC) is also the frequency FSC of the standard NTSC chrominance subcarrier (actually 3.579545 MHz). The standard NTSC chrominance subcarrier is quadrature modulated with the center panel (main panel) I and Q components. The phase of the auxiliary subcarrier reverses from field to field relative to the phase of the standard NTSC chrominance subcarrier.

The YSH modulating information is initially in symmetrical double sideband form with respect to the auxiliary subcarrier frequency, but the auxiliary subcarrier exhibits an unsymmetrical YSH vestigial sideband configuration after the YSH upper sideband is limited to the 4.2 MHz channel limit frequency. Luminance side highs signal YSH has energy in the frequency range of 1.0 MHz to 5.4 MHz before time expansion. After time expansion by a factor of 3.0, the side highs information is mapped to a lower frequency range of 0.33 MHz to 1.8 MHz. Side panel low frequency luminance information including DC is time compressed into horizontal overscan regions as described in U.S. Pat. No. 4,816,899—Strolle et al. In this regard it is noted that various disclosed frequencies and bandwidths are based upon a side panel low frequency luminance time compression factor of 4:1 in this example. However, other time compression factors, such as 5:1, could also have been chosen depending upon the requirements of a particular system. The time expanded lower YSH sideband of modulated auxiliary subcarrier ASC ranges from 1.78 MHz to 3.25 MHz as shown in FIG. 4. The time expanded upper YSH sideband of modulated auxiliary subcarrier ASC ranges from 3.91 MHz to 5.38 MHz but is limited to 4.2 MHz by low pass channel filtering, which produces unsymmetrical YSH sidebands.

The side panels contain narrowband "Q" color difference information with a bandwidth of 642 KHz (including DC), which is 1.284 times the 500 KHz bandwidth of a standard NTSC Q color difference component. The factor 1.284 is a center panel time expansion factor for developing an NTSC compatible main component from the original widescreen signal. After time expansion by a factor of 3.0, the side panel chrominance Q bandwidth drops from 642 KHz to about 210 KHz. This bandwidth is small enough so that when double sideband modulated on a 3.58 MHz carrier it occupies the frequency gap between the upper frequency limit of the lower YSH sideband (3.25 MHz) and the lower frequency limit of the upper YSH sideband (3.91 MHz).

The side panels also contain wideband "I" color difference information to enhance side panel color resolution. The side panel wideband "I" information exhibits a bandwidth of approximately 1.5 MHz, which drops to 0.5 MHz after time expansion by a side panel time expansion factor of 3.0.

The time expanded side panel Q and wideband I chrominance components, hereafter referred to as QS and IS respectively, quadrature amplitude modulate the auxiliary subcarrier. Specifically, side panel narrowband chrominance component QS and side panel luminance highs component YSH are frequency division multiplexed and modulate the same quadrature (90°) phase auxiliary subcarrier component. This modulated auxiliary subcarrier component is designated ASC' and exhibits unsymmetrical sidebands with respect to YSH information and symmetrical double sidebands with respect to QS information, as illustrated.

Side panel wideband component IS modulates the 0° phase auxiliary subcarrier component. This auxiliary subcarrier component is designated ASC and exhibits double sideband IS modulation with an unsymmetrical amplitude characteristic around the 3.58 MHz auxiliary subcarrier frequency. The illustrated shape of the IS amplitude characteristic results from filtering IS modulated auxiliary subcarrier ASC with a 3.58 MHz high pass "inverse" Nyquist filter at a transmitter/encoder to facilitate proper quadrature demodulation without crosstalk to a receiver/decoder, as will be explained in connection with FIGS. 1 and 2.

The choice of the standard 3.58 MHz chrominance subcarrier frequency as the auxiliary subcarrier frequency provides several benefits. Hardware cost and complexity are reduced because this frequency is readily available at both the transmitter encoder and the receiver decoder. Phase errors around 3.58 MHz creates similar chrominance artifacts in both center and side panels, thereby reducing dissimilarities in displayed side and center panel information. A so-called "jail bars" artifact, such as has been known to be present in some 5:3 widescreen systems, is also significantly reduced or eliminated from an image displayed by a compatible receiver which receives the processed widescreen signal, since side panel chrominance information is placed horizontally adjacent to side panel luminnce information in the frequency spectrum associated ith the auxiliary subcarrier. The "jail bars" artifact is caused by modulation of high energy side panel chrominance information into portions of the horizontal-vertical-temporal spectrum that are demodulated as flickering luminance stripes in compatible NTSC receiver displays.

FIG. 1 shows details of widescreen television signal transmitter apparatus for encoding an NTSC compatible 16:9 aspect ratio widescreen television signal in accordance with the present invention. A widescreen television signal source 10, such as a television camera, provides 525 line, 2:1 interlaced color difference components wideband I' and Q' and a luminance component Y'. The wideband I' and Q' chrominance components are respectively low pass filtered in the horizontal, vertical and temporal (HVT) dimensions by units 12 and 13 to produce filtered components IF and QF. Units 12 and 13 each include a 3×3 (pixel) diamond shaped low pass filter oriented along vertical-temporal (VT) diagonal axes, and respective 1.5 MHz and 0.5 MHz horizontal low pass filter elements. Luminance component Y' is filtered by an HVT chrominance notch (band reject) filter 14 to produce a filtered luminance component YF. Filter 14 includes an input 3×3 VT chrominance bandpass filter which receives signal Y', followed by a 2.0 MHz horizontal high pass filter. An output signal from the high pass filter is subtracted from input signal Y' to produce output signal YF.

Components IF, QF and YF above 1.5 MHz are separately intraframe averaged by means of units 16, 17 and 18, respectively. As disclosed in U.S. Pat. No. 4,855,811 for example, intraframe averaging is a signal conditioning technique which prepared two signals for mutual combining so that they can be recovered efficiently and accurately afterwards, such as by means of a field storage device. More specifically, with this technique a group of pixels one field (262H) apart is made to contain pixels of identical value such as by replacing original pixel values with their average value. Signal YF is intraframe processed above a given frequency such as 1.5 MHz, while the full bandwidth of signals IF and QF is intraframe processed. Frequency selective intraframe processor 18 includes a bandsplitter which provides low band and high band (above 1.5 MHz) output components. The high band component is intraframe averaged and afterwards combined with the low band component to form the output signal of processor 18.

The center panel areas of intraframe averaged signals Y, I and Q are time expanded by a factor 1.284 in units 20, 21 and 22 respectively. The I and Q components from units 20 and 21 are applied to a conventional NTSC chrominance modulator 24 where they respectively modulate 3.58 MHz quadrature phased standard chrominance subcarriers SC and SC'. Subcarriers SC and SC' are generated by a network including a 3.58 MHz sinusoidal signal generator 70 for developing carrier SC, and a 90° phase shifter 72 for developing quadrature carrier SC' from carrier SC. An auxiliary 3.58 MHz subcarrier ASC is derived from carrier SC by means of a field phase control unit 74, which produces auxiliary carrier ASC with a phase that reverses from field to field relative to the phase of the standard chrominance subcarrier. A 90° phase shifter 76 produces an auxiliary subcarrier ASC' in phase quadrature with auxiliary subcarrier ASC. Auxiliary subcarrier ASC' also exhibits a phase that reverses from field to field relative to the phase of the standard chrominance subcarrier.

Signal YF from filter 14 is also applied to a 1 MHz horizontal bandsplit filter 28 which divides signal YF into a low frequency component YL including DC, and a high frequency component YH above 1 MHz. The side panel region of signal YL is time compressed by a factor of 4.0 in a unit 30. The output signal from unit 30 contains side panel low frequency information time compressed into respective right and left horizontal image overscan regions, each of which is about 2 microseconds wide in this example. The time compressed luminance side lows signal from unit 30 and the time expanded center panel luminance signal from unit 22 are time multiplexed together by means of a time multiplexer (MUS) unit 32. An adder 38 combines the modulated center panel chrominance signal from unit 24, and the signal from MUX 32 containing main panel luminance information and low frequency side panel luminance information compressed into horizontal overscan regions, to produce an output signal designated as COMPONENT 1.

COMPONENT 1 contains information which is compatible with standard NTSC television receivers having a 4:3 image aspect ratio and which is intended to be viewed by a standard NTSC receiver. This component is combined in a unit 40 with additional side panel information contained in a COMPONENT 2 to produce an NTSC compatible widescreen television signal which will develop a 16:9 widescreen image when displayed by a widescreen receiver. The output signal from combiner 40 is frequency limited by means of a 4.2 MHz low pass filter 41. The filtered output signal can be conveyed via any number of conventional transmission media such as terrestrial RF broadcast or cable, for example.

side panel COMPONENT 2 is developed as follows. Luminance highs signal YH from filter 28 is intraframe averaged by a unit 42 before being applied to a unit 44, which time expands the side panel portions of signal YH by a factor of 3.0 to produce signal YSH. The side panel portions of chrominance components wideband I and Q from units 16 and 17 are similarly processed by units 45 and 46 to produce time expanded side panel signals wideband IS and QS, respectively.

Time expanded luminance side highs signal YSH is applied to an auxiliary 3.58 MHz quadrature amplitude modulator 50 for modulating 90° phase auxiliary subcarrier ASC'. A resulting symmetrical double sideband YSH amplitude modulated output signal from modulator 50 is converted by means of output filter 41 to an unsymmetrical vestigial sideband signal with a 4.2 MHz upper frequency limit, as shown in FIG. 4.

Time expanded side panel chrominance component QS from unit 46 and time expanded wideband component IS from unit 45 are applied to an auxiliary 3.58 MHz quadrature amplitude modulator 55 including multipliers 80 and 82 and an adder 88. An inverse Nyquist slope filter 84 is associated with modulator 55. Signal QS modulates 90° phase auxiliary subcarrier component ASC' via multiplier 80. Signal IS modulates 0° phase auxiliary subcarrier component ASC via multiplier 82. This modulated auxiliary subcarrier component is afterwards processed by inverse Nyquist slope filter 84 as will be discussed. Quadrature amplitude modulated auxiliary subcarrier components ASC and ASC' are combined by adder 88.

The modulated luminance side highs signal from modulator 50 and the modulated chrominance sides signal from the output of combiner 88 in modulator 55 are amplitude attenuated by factors of 0.5 and 0.25 in units 54 and 57 respectively, to reduce the likelihood of these signals creating interference in standard 4:3 aspect ratio NTSC receivers. The chrominance modulated signal from modulator 55 is attenuated more heavily than the luminance modulated signal from modulator 50 because the chrominance modulated signal contains more energy due to its dual sidebands, and because it may contain a high energy DC component, e.g., in the case of a color video signal. The attenuated signals from units 54 and 57 are combined in an adder 60 to produce COMPONENT 2, which is thereafter combined with COMPONENT 1 in adder 40.

FIG. 5 illustrates the frequency spectrum of modulated auxiliary subcarrier component ASC' of output side panel COMPONENT 2, including symmetrical double sideband QS information and vestigial sideband YSH information. FIG. 6 illustrates the frequency spectrum of IS modulated auxiliary subcarrier component ASC of side panel COMPONENT 2, having an unsymmetrical amplitude response over the modulation bandwidth. The unsymmetrical amplitude response around the 3.58 MHz subcarrier frequency is the complement of a Nyquist filter amplitude response in the receiver/decoder shown in FIG. 2.

FIG. 2 shows details of a portion of a widescreen television receiver including apparatus for decoding the widescreen signal generated by the arrangement of FIG. 1. A received baseband encoded widescreen television signal (e.g., from an RF tuner and intermediate frequency assembly not shown) is applied to a 1.7 MHz horizontal bandsplit filter 110 for producing an output low band signal (LOWS), and an output high band signal (HIGHS) which is applied to an intraframe processor 112. Processor 112 averages (additively combines) and differences (subtractively combines) image lines 262H apart within frames above 1.7 MHz to recover main COMPONENT 1 at an averaging output AVG, and to recover auxiliary side panel COMPONENT 2 at a differencing output DIFF, substantially free of vertical-temporal crosstalk. A 200 KHz horizontal crosstalk guardband is provided between the lower limit operating frequency of unit 112 and the 1.5 MHz lower limit operating frequency of the center panel intraframe averager in the encoder of FIG. 1, to ensure that unit 112 processes only information that was intraframe averaged. Recovered COMPONENT 1 from unit 112 contains information which is essentially identical to image information of main COMPONENT 1 developed at the encoder due to intraframe processing. Additional details of processor 112 can be found in previously mentioned U.S. Pat. No. 4,855,811.

The main COMPONENT 1 signal from the averaging output (AVG) of unit 112 is subjected to three dimensional horizontal, vertical and temporal filtering in a filter 114. Filter 114 includes 3×3 Vertical-Temporal and horizontal filtering networks for providing modulated main panel chrominance information at a bandpass (BP) output, and high frequency main panel luminance information devoid of chrominance information at a chrominance notch output (NOTCH). An adder 116 combines the low and high frequency main panel luminance components from the outputs of filters 110 and 114 to produce reconstituted main panel luminance information at an output. This information is combined with the overscan region luminance information (which includes the time compressed side panel low frequency information) by means of a time multiplexer 118.

The modulated main panel chrominance component from filter 114 is demodulated by means of a quadrature demodulator 120 responsive to locally generated, burst-referenced, standard NTSC chrominance subcarrier quadrature reference signals SC and SC'. Demodulated output signals from unit 120 are horizontally low pass filtered by means of a 0.5 MHz filter 122 and a 1.5 MHz filter 124, respectively, to produce chrominance difference component Q and wideband chrominance difference component I. These components are respectively time compressed by main panel compression units 130 and 132 with the inverse of the corresponding main panel time expansion factor at the encoder to restore the original spatial dimensions of the main panel information. Similarly, the main panel and overscan luminance components are respectively time compressed and time expanded by means of units 134 and 136 to restore their original spatial relationships.

Restored main panel chrominance component Q from unit 130 and restored side panel chrominance component QS from unit 162 are spliced by means of a splicer 140 to produce a reconstituted 525 line 2:1 interlaced widescreen color component Q'. Restored main panel wideband chrominance component I from unit 132 and a restored side panel wideband chrominance component IS from a unit 164 are spliced by means of a splicer 142 to produce a reconstituted widescreen color component I'. Restored main panel luminance information from unit 134 and restored side panel luminance information are spliced by means of a unit 144 to produce reconstituted widescreen luminance component Y'. Reconstituted widescreen components I', Q' and Y' are afterwards matrixed and processed by conventional television video signal processing networks to produce color image representative signals suitable for display by an image reproducing device. The side panel components which are combined with the main panel components as noted above are developed from COMPONENT 2 as follows.

COMPONENT 2 from the differencing (DIFF) output of processor 112 is amplified by a factor of 4.0 in a unit 150 to compensate for the attenuation by a factor of 0.25 in unit 57 of the encoder (FIG. 1). The amplified signal is demodulated by a 3.58 MHz synchronous quadrature amplitude demodulator 152 which includes multipliers 180 and 182. A Nyquist slope filter 184 is associated with demodulator 152. Demodulator 152 responds to quadrature phase related auxiliary reference subcarrier signals ASC and ASC' synchronized with corresponding signals employed by the auxiliary modulator network at the encoder. Multiplier 180 responds to an auxiliary subcarrier reference signal ASC' of nominal 90° phase, and to COMPONENT 2 from unit 150 after being processed by Nyquist slope filter 184, for producing demodulated side panel signals YSH and QS. Multiplier 182 produces side panel signal IS in response to COMPONENT 2 from unit 150 and in response to 0° auxiliary subcarrier reference signal ASC. FIG. 7 illustrates the spectral diagram of YSH, QS modulated 90° phase auxiliary subcarrier component ASC after processing by Nyquist slope filter 184, before demodulation. FIG. 8 depicts the spectral diagram of IS modulated 0° phase auxiliary component ASC after processing by Nyquist slope filter 184, before demodulation. The symmetrical double sidebands of the IS modulated quadrature component ASC shown in FIG. 8 result from the cascade of decoder Nyquist slope filter 184 and complementary (inverse) encode Nyquist slope filter 84.

The cascade of inverse Nyquist processing at the encoder with Nyquist processing at the decoder produces a desired flat amplitude response for demodulated signal YHS at the decoder, and also assures that modulated auxiliary subcarrier component ASC exhibits symmetrical double sideband IS information so that proper quadrature demodulation is achieved at the decoder, i.e., so that the IS remains in desired phase relationship and does not crosstalk into components YSH or QS.

Imparting a Nyquist slope to the higher energy double sideband region of the combined YSH, QS modulated signal (from 3.08 MHz to 4.08 MHz) reduces the effective energy of the double sideband region by one-half, so that a flat demodulation amplitude response results over the auxiliary subcarrier modulation frequencies. Without Nyquist slope filtering at the decoder, demodulating auxiliary subcarrier component ASC' would produce an uneven YSH output amplitude response due to the mutually unequal energy distribution in the unsymmetrical YSH sidebands. Nyquist slope filter 184 at the decoder symmetrically low pass filters quadrature modulated COMPONENT 2 such that a one-half amplitude response occurs in the middle of the higher energy double sideband region at the 3.58 MHz auxiliary subcarrier frequency, over the 3.08 MHz and 4.08 IS signal bandwidth, as shown in FIG. 7.

COMPONENT 2 from unit 150 in the decoder (FIG. 2) also contains quadrature modulation component IS, which is subjected to low-pass Nyquist slope processing by filter 184. Such processing causes IS modulated auxiliary subcarrier component ASC to have an uneven amplitude response over the range of IS modulation frequencies. To compensate for this amplitude effect, at the encoder the IS modulated auxiliary subcarrier component ASC is processed by high-pass Nyquist slope filter 84, which has the inverse (i.e., complementary) characteristics of decoder Nyquist slope filter 184. Thus, at the decoder, IS modulated auxiliary subcarrier component ASC, as applied to multiplier 180 in the YSH, QS demodulator, exhibits a symmetrical double sideband amplitude response over the range of IS frequencies as shown by FIG. 8. This symmetrical double sideband response assures that the IS information will be in quadrature with the YSH, QS information at the demodulator, whereby the IS information is rejected by the YSH, QS demodulator. Inverse Nyquist slope filtering at the encoder also advantageously reduces the energy of signal IS, which reduces the likelihood that IS information will interfere with standard television signal information. The demodulated YSH and QS components are separated by subsequent filtering.

The YSH, QS information is symmetrically double sideband over the 3.08 MHz-4.08 MHz IS frequency range, and is rejected by IS synchronous amplitude demodulator 152. The demodulated IS output signal from unit 152 is filtered by as 2.0 MHz horizontal low pass filter 155. The YSH, QS demodulated output signal from multiplier 180 of demodulator 152 is filtered by a 2.0 MHz horizontal low pass filter. The side panel output signals from filters 154 and 155 are time compressed by units 156 and 157, which respectively exhibit the inverse of the encoder side panel time expansion factor. The output signal from unit 156 is processed by a 0.6 MHz horizontal bandspass filter 162 to produce a side panel luminance high frequency YSH component at a high pass output (H), and the side panel chrominance QS component at a low pass output (L). An adder 170 combines the side panel luminance highs component with the side panel luminance lows component from unit 136 to produced the reconstituted side panel luminance component which is applied to splicer 144. The output signal from unit 157 is processed by a 1.5 MHz horizontal low pass filter 164 to produce side panel chrominance component IS, which is applied to splicer 142 as mentioned previously. Signals Y', I' and Q' are afterwards combined as known to produce a widescreen image representative signal for display.

What is claimed is:

1. In a system for processing a widescreen television-type signal containing main panel image information and side panel image information containing a luminance component and first and second color components, side panel signal processing apparatus comprising:

means for providing first and second differently phased auxiliary subcarrier signals, other than a standard chrominance subcarrier conveying main panel chrominance information, at a common frequency;

means for modulating said first auxiliary subcarrier with said first side panel color component to form a double sideband modulated signal with respect to said first side panel color component; and means for modulating said second auxiliary subcarrier with (a) said second side panel color component to form a double sideband modulated signal with respect to said second side panel color component, and with (b) side panel high frequency luminance information to form an unsymmetrical sideband modulated signal with respect to said side panel high frequency luminance information; wherein said first side panel color component is a wideband component having a wider bandwidth than said second side panel color component.

2. Apparatus according to claim 1, wherein said first and second side panel color components are "I" and "Q" color difference components, respectively.

3. Apparatus according to claim 2, wherein said first and second auxiliary subcarriers are quadrature phase related and exhibit a field alternating phase unlike that of a standard chrominance subcarrier.

4. Apparatus according to claim 1 and further including
   filter means for imparting an unsymmetrical amplitude response over the modulation frequencies of said modulated first auxiliary subcarrier.

5. Apparatus according to claim 4, wherein said filter means is a Nyquist slope filter.

6. Apparatus according to claim 1, wherein said filter means is a high pass Nyquist slope filter; and
   said second auxiliary subcarrier is a vestigial sideband modulated signal with respect to said side panel frequency luminance information.

7. Apparatus according to claim 1, wherein
   said modulated first and second auxiliary subcarriers are located in a common baseband channel.

8. In a system for receiving a widescreen television-type signal containing main panel image information and side panel image information containing a luminance component and first and second color components, first and second differently phased auxiliary subcarrier signals other than a standard chrominance subcarrier sharing a common frequency, said first auxiliary subcarrier being modulated with said first side panel color component to form a double sideband modulated signal with respect to said first side panel color component, said second auxiliary subcarrier being modulated with (a) said second side panel color component to form a double sideband modulated signal with respect to said second side panel color component, and with (b) side panel high frequency luminance information to form an unsymmetrical sideband modulated signal with respect to said side panel high frequency luminance information, wherein said first side panel color component is a wideband component having a wider bandwidth than said second side panel color component; side panel signal processing apparatus comprising:

means for separating said main panel information and said modulated auxiliary subcarriers containing side panel information;

first demodulator means for receiving a first reference signal exhibiting the phase of said first auxiliary subcarrier, and for receiving a signal comprising said separated auxiliary subcarriers for providing a demodulated first side panel color component; and second demodulator means for receiving a second reference signal exhibiting the phase of said second auxiliary subcarrier, and for receiving a signal comprising said separated auxiliary subcarriers, for providing a demodulated second side panel color component.

9. Apparatus according to claim 8 and further comprising
   Nyquist slope filter means for conveying said signal comprising said separated auxiliary subcarriers to said second demodulator.

10. Apparatus according to claim 8, wherein
    said first and second side panel color components are respectively wideband "I" and "Q" color difference components;
    said first and second reference signals are quadrature phased and exhibit a field alternating phase unlike that of a standard chrominance subcarrier; and
    a Nyquist slope filter conveys said signal comprising said separated auxiliary subcarriers to said second demodulator.

11. Apparatus according to claim 10, wherein said Nyquist slope filter exhibits a low pass response.

12. Apparatus according to claim 8, wherein said first and second auxiliary subcarriers are disposed in a common baseband channel.

13. In combination with said receiving system apparatus according to claim 9, transmitting apparatus comprising:

means for providing first and second differently phased auxiliary subcarrier signals, other than a standard chrominance subcarrier, at a common frequency;

means for modulating said first auxiliary subcarrier with said wideband first side panel color component to form a double sideband modulated signal with respect to said first side panel color component;

means for modulating said second auxiliary subcarrier with (a) said second side panel color component to form a double sideband modulated signal with respect to said second side panel color component, and with (b) side panel high frequency luminance information to form an unsymmetrical sideband modulated signal with respect to said side panel high frequency luminance information;

inverse Nyquist slope filter means for imparting to modulating information of said first auxiliary subcarrier an amplitude-versus-frequency characteristic which is the complement of the amplitude-versus-frequency response of said Nyquist slope filter means; and means for combining said first and second modulated auxiliary subcarriers.

14. Apparatus according to claim 13, wherein said wideband first color component and said second color component are "I" and "Q" color difference components, respectively;

said first and second auxiliary subcarriers are quadrature phase related;

said Nyquist slope filter of said receiving system exhibits a low-pass response; and said inverse slope Nyquist filter of said transmitting system exhibits a complementary high-pass response.

* * * * *